T. CARENCE.
WINDOW.
APPLICATION FILED DEC. 30, 1915.

1,196,081.

Patented Aug. 29, 1916.
2 SHEETS—SHEET 1.

Witness
M. E. Bohn

Inventor
T. Carence,
By George S. Thorpe
Attorney

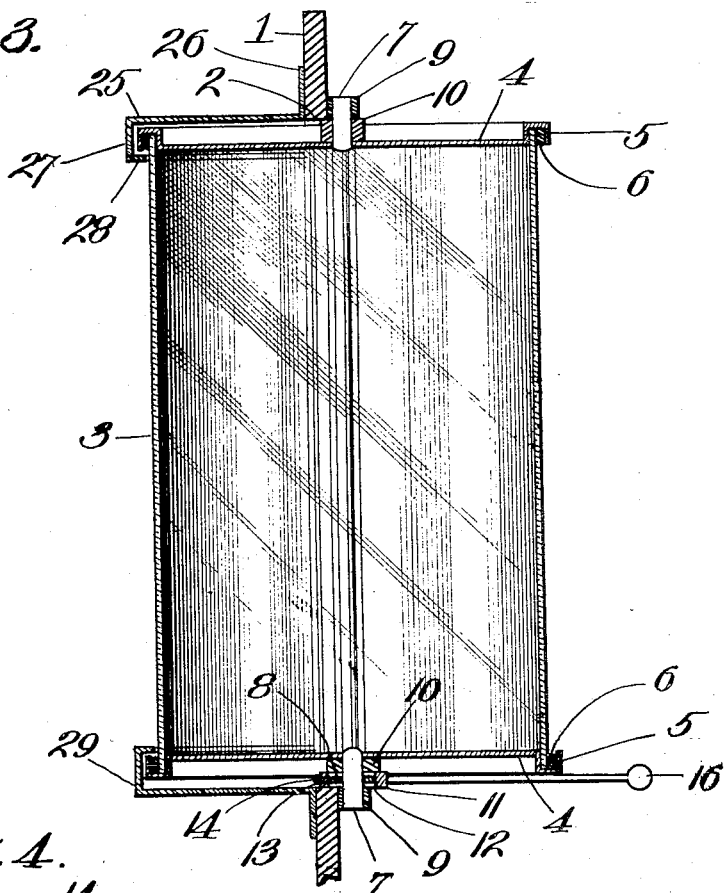
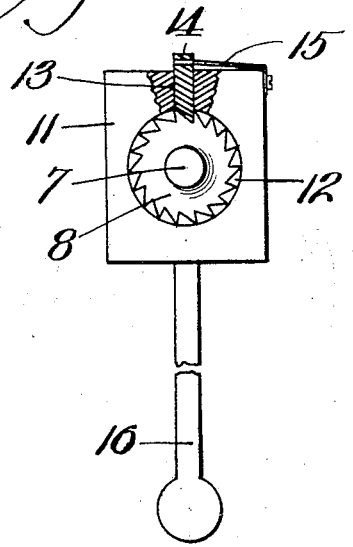
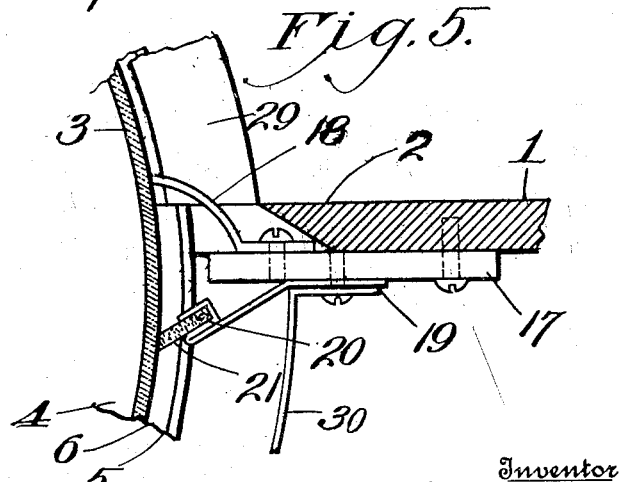

UNITED STATES PATENT OFFICE.

THOMAS CARENCE, OF KANSAS CITY, MISSOURI.

WINDOW.

1,196,081. Specification of Letters Patent. Patented Aug. 29, 1916.

Application filed December 30, 1915. Serial No. 69,364.

*To all whom it may concern:*

Be it known that I, THOMAS CARENCE, a citizen of the United States, residing at Kansas City, in the county of Jackson and State of Missouri, have invented certain new and useful Improvements in Windows, of which the following is a specification.

This invention relates to windows for use primarily on locomotive cabs and other self-propelled vehicles, such as interurban cars and automobiles, and has for its object to provide a window of cylindrical form which is always closed and is rotatable to shift the fog, rain or snow covered surface out of the line of vision and replace it with clear or unobstructed surface.

A further object is to produce a hollow cylindrical window containing a vacuum, so as to avoid the accumulation of moisture on the interior of the cylinder by condensation of air therein.

A further object is to provide means for automatically scraping snow, rain and moisture produced by condensation, from the window and for wiping the same.

With these general objects in view the invention consists of certain novel and peculiar features of construction and combinations of parts as hereinafter described and claimed; and in order that it may be fully understood reference is to be had to the accompanying drawings, in which—

Figure 1:
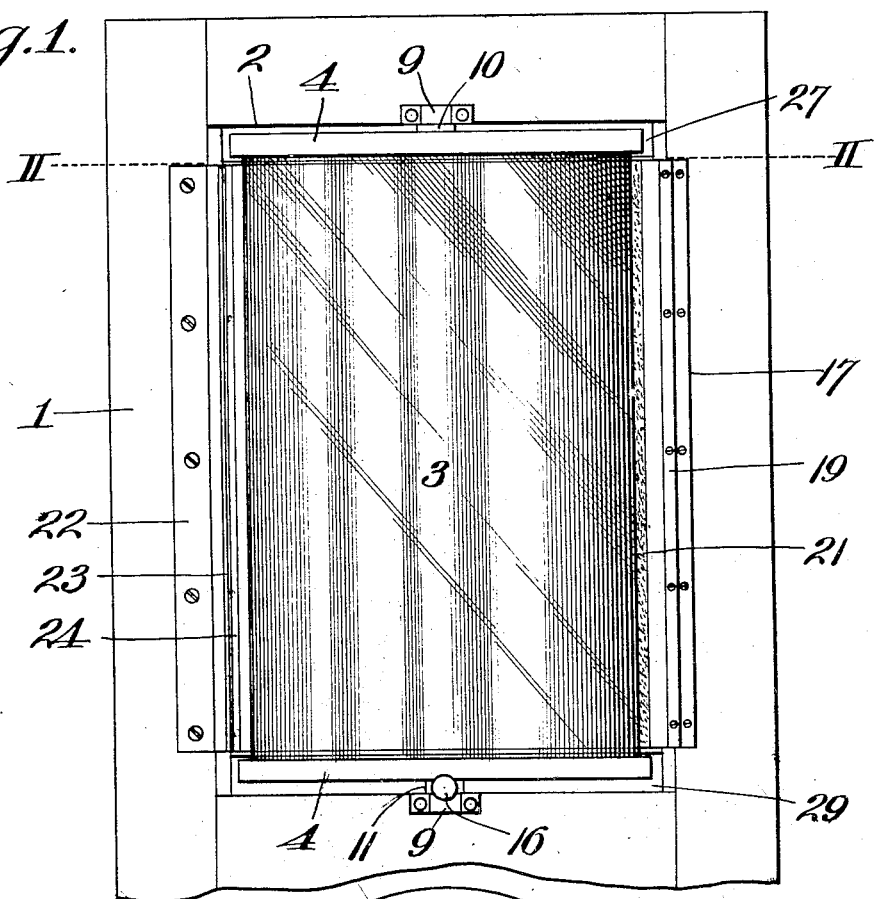
Figure 2:
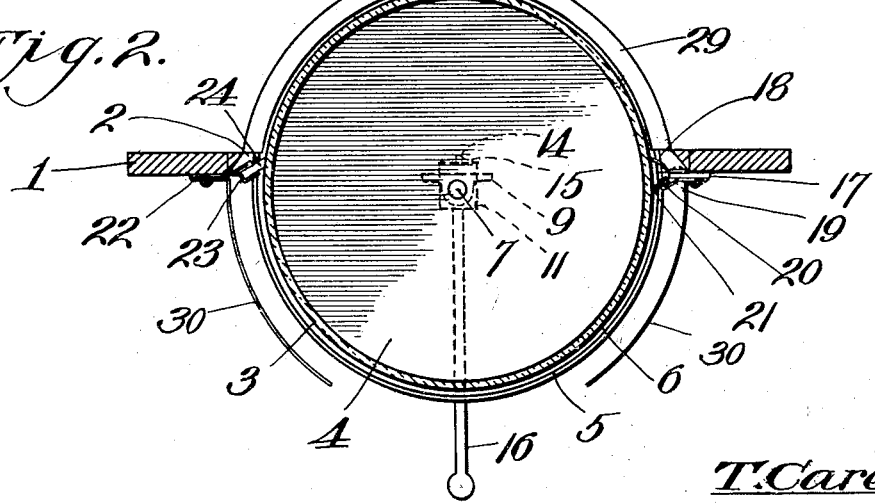

Figure 1, is a face view of a part of a locomotive cab door equipped with a window embodying the invention. Fig. 2, is a horizontal section taken on the line II—II of Fig. 1. Fig. 3, is a vertical section taken centrally of Fig. 1. Fig. 4, is an enlarged detail view showing the operating mechanism of the window. Fig. 5, is an enlarged fragmentary section taken in the same plane as Fig. 2.

Before proceeding with a detailed description of the invention, it is desired to state that the window may be arranged horizontally or at any desired angle as well as in the vertical position shown, and that it may be proportioned to accommodate it for application to the wind shield of an automobile, either of the open or closed type, or it may be set in the front window of an electric car so that the motorman shall always have a clear vision space through which he can observe the track ahead.

Referring now to the drawings, in detail, 1 indicates the narrow door provided at the front end of a locomotive cab to enable the engineer or fireman to step out upon the running board, not shown, of the locomotive, when necessary, though it is to be understood that the window need not be set in the door. As shown the door is provided with an opening 2, and set in said opening is a cylindrical window 3 composed of glass or equivalent material and provided with metal heads 4. As a practical method of securing the heads of the cylinder with an air tight relation, the heads are provided with marginal grooves 5 receiving the cylinder, and a suitable cement 6 or the like is disposed in the grooves. Any suitable method may be employed for producing a vacuum in the cylinder.

The heads are provided with alined pivots 7 and secured upon one of the pivots is a ratchet wheel 8. The pivots are journaled in bearings 9 secured to the door at the inner side thereof and interposed between one of the heads and the adjacent bearing 9 is a spacing collar 10, a similar collar 10 being interposed between the other head and the ratchet wheel 8.

11 is a block provided with a central opening 12 receiving the ratchet wheel 8 and with a radial opening 13 receiving the slidable dog or pawl 14, a spring 15 being secured to the block and to the pawl to force the latter yieldingly against the peripheral or toothed portion of the ratchet wheel so as to lock the same against rotation in one direction and impart rotation to the ratchet wheel and the cylindrical window when the block is turned in the proper direction through the instrumentality of the handle or lever 16 disposed within convenient reach of the engineer within the cab.

17 is a plate secured to the inner side face of the door at one side of the cylindrical window and secured to the outer side of said plate within the opening 2 is an angular scraper 18, the free end of the same bearing against the outer side of the cylinder for nearly the full length of the same. Secured to the opposite side of the plate 17 is a resilient angle plate 19 formed at its inner edge with a groove 20 containing a suitable wiping strip 21 of cloth or equivalent material, the same extending obliquely inward and bearing at its free end against the outer surface of the window. A resilient plate 22 is also secured to the inner face of the door but at the opposite side of the window from the scraper and wiper described and said resilient plate 22 extends convergingly outward with relation to the scraper and is provided with a groove 23 wherein is secured a rubber or equivalent drying strip 24 which engages the outer surface of the cylinder and acts as a squeegee to dry the same.

To guard against the deposit of snow or rain upon the upper end of the cylinder a semi-cylindrical shield 25 covers the end of the window lying outside the plane of the cab and is provided with an upwardly projecting flange 26 fitting against and secured to the door. At its outer margin the shield 25 is provided with a flange 27 depending to a plane below the upper head 4 and said flange terminates in an inturned portion 28 to bridge the joint between the head and the flange 27 and thereby guard against snow or rain blowing up through such joint and upon the head. A similar shield 29, inverted with respect to shield 25, is secured to the door below the window and incloses the same and its lower head sufficiently to prevent snow working its way through below the window and upon said shield.

With this device in operative position it will be apparent that in frosty weather the moisture will collect upon that portion of the window standing within the cab. If this results in rendering it difficult to readily see through the window, the engineer will swing the handle or lever 16 to the left for the purpose of turning the window in the same direction. In this action the moisture will be removed from the cylinder and the latter dried by the action thereof of the rubber strip or squeegee 24. If snow adheres to the cylinder, the scraper 18 will remove it as the cylinder is turned as described and the wiper 21 will make this scraping action more thorough by wiping against the cylinder. If the outer side of the cylinder is wet from rain, the wiper will remove most of the moisture from the cylinder. It is desirable to use two squeegees 21 and 24 as they simultaneously wipe the cylinder at diametrically opposite points and thus under about one-half revolution of the cylinder provide for a clear vision through the same. The strip 21 wipes the side brought from the outside to the inside of the cab, and the strip 24, wipes moisture from the surface which moves in the adjustment mentioned, from within the cab to a point outside the same. The frictional engagement of the squeegees is sufficient to hold the window against back rotation when the handle is swung back or to the right to position it for the next rotation of the window, the spring 15, yielding in this reverse movement of the lever or handle to permit the pawl or dog to slide inoperatively over the teeth of the ratchet wheel. To cause the engineer in the cab to always glance through the window near the central portion thereof, arcuate blinds 30, are secured to the frame 1, and partly overlap the side portions of the cylinder, said blinds being shown only in Fig. 2.

From the above description it will be apparent that I have produced a window possessing the features of advantage enumerated as desirable in the statement of the object of the invention, and I wish it to be understood that while I have illustrated and described what now appears to be the best embodiment of the invention, I reserve the right to make all changes falling within the spirit and scope of the appended claims.

I claim:—

1. The combination of a suitable support having an opening, a cylindrical window of transparent material closing said opening, means to clean the surface of the window, and means to effect relative movement of the window and the cleaning means to clean the former.

2. The combination of a suitable support having an opening, a cylindrical window of transparent material closing said opening, means to clean the surface of the window, and means for shielding the ends of the cylindrical window exterior of the support from snow and the like.

3. The combination of a suitable support having an opening, a cylindrical window of transparent material rotatably mounted in said opening, means to rotate the window, and means to clean its surface as it is turned.

4. The combination of a suitable support having an opening, a cylindrical window of transparent material rotatably mounted in said opening, means to rotate the window, means to clean its surface as it is turned, and semi-cylindrical shields inclosing the ends of the cylindrical window exterior of the support.

5. The combination of a suitable support having an opening, a cylindrical window of transparent material rotatably mounted in said opening, a scraper bearing against the window, and means to rotate the window to effect operation of the scraper.

6. The combination of a suitable support having an opening, a cylindrical window of transparent material rotatably mounted in said opening, a squeegee bearing against said window, and means to rotate the window to effect operation of the squeegee.

7. The combination of a suitable support having an opening, a cylindrical window of transparent material rotatably mounted in said opening, a scraper bearing against the exterior surface of the window at the outer side of the support, a squeegee engaging the surface of the window to wipe the side of the same at the inner side of the support, and means to rotate the window.

8. The combination of a suitable support having an opening, a hollow cylindrical window journaled in the support and containing a vacuum, means to rotate the window, and means to clean its exterior surface as it turns.

9. The combination of a suitable support having an opening, a cylindrical window of transparent material rotatably mounted in said opening, cleaning devices frictionally engaging the exterior surface of the cylinder, and a pawl and ratchet mechanism for intermittently rotating the cylinder.

In testimony whereof, I affix my signature, in the presence of two witnesses.

THOMAS CARENCE.

Witnesses:
  H. C. RODGERS,
  G. Y. THORPE.